United States Patent [19]

Yasukawa

[11] Patent Number: 4,750,013
[45] Date of Patent: Jun. 7, 1988

[54] AUTOMATIC FOCUS ADJUSTMENT CAMERA

[75] Inventor: Seiichi Yasukawa, Kawasaki, Japan

[73] Assignee: Nippon Kogaku K. K., Tokyo, Japan

[21] Appl. No.: 83,844

[22] Filed: Aug. 10, 1987

[30] Foreign Application Priority Data

Aug. 15, 1986 [JP] Japan .................. 61-191403

[51] Int. Cl.[4] .................................... G03B 3/00
[52] U.S. Cl. .................................... 354/400; 354/402; 354/195.1
[58] Field of Search ............. 354/400, 401, 402, 195.1

[56] References Cited

U.S. PATENT DOCUMENTS

| 4,464,037 | 8/1984 | Terui et al. | 354/400 |
| 4,550,993 | 11/1985 | Taniguchi et al. | 354/402 |
| 4,607,931 | 8/1986 | Aihara | 354/400 |
| 4,609,274 | 9/1986 | Iwashita et al. | 354/400 |

FOREIGN PATENT DOCUMENTS

41331 9/1985 Japan .

Primary Examiner—Russell E. Adams
Attorney, Agent, or Firm—Shapiro and Shapiro

[57] ABSTRACT

An automatic focus detection camera includes means for driving a photo-taking lens to obtain the in-focus state, operating means operated from an initial state to a first operating state and subsequently to a second operating state, and means for controlling the drive means so as to continuously effect the in-focus driving of the photo-taking lens, for example, for a predetermined time when the operating means is in the initial state. The control means further drives the photo-taking lens until the in-focus state is obtained when the operating means is operated to the first operating state, and controls the drive means so as to restrain the photo-taking lens at that position when the in-focus state is obtained.

6 Claims, 5 Drawing Sheets

FIG.6
MONITOR ROUTINE

AUTOMATIC FOCUS ADJUSTMENT CAMERA

BACKGROUND OF THE INVENTION

1. Field of the Invention

This invention relates to an automatic focus adjustment camera in which the focus deviation relative to the object field is detected to automatically accomplish the focus adjustment of a photo-taking lens.

2. Related Background Art

Generally, in an automatic focus adjustment camera, the focus deviation relative to the object field is detected and the focus adjustment of a photo-taking lens is automatically accomplished on the basis of the detected focus deviation information, and as the processing sequence for this automatic focus control, various propositions have heretofore been made from the relation to the photographing operating by the photographer.

For example, a system for starting the servo control of the photo-taking lens by the first operation of the shutter release button of the camera, for example, the operation of depressing the shutter release button by a first stroke, is widely known, and this system is broadly divided into the so-called one-shot servo system wherein the in-focus state obtained by the servo control of the lens is held until the first operation of the shutter release button is released and the so-called continuous servo system wherein the servo control of the lens is continued so that the lens is focused to the object field as long as the first operation of the shutter release button is continued.

Moreover, the one-shot servo system is an in-focus priority system wherein even if shutter release is attempted by the second operation of the shutter release button, for example, the operation of depressing the shutter release button to a second stroke, the exposure operation by the shutter of the camera is not accomplished unless and after the in-focus state has been obtained by the servo control of the lens, whereas the continuous servo system is usually a release priority system wherein even if the in-focus state is not obtained before the servo control of the lens is completed, the exposure operation can be executed at any time by the operation of the shutter release button to the second stroke.

For example, Japanese Patent Publication No. 41331/1985 proposes an automatic focus adjustment camera provided with the one-shot servo system and the continuous servo system and usable with these two systems changed over by the photographer by means of a mode change-over device.

However, the one-shot servo system and the continuous servo system have their own merits and demerits, and where the change-over system for the two systems is adopted, their respective merits can be effectively availed of, but their demerits are unavoidable.

That is, in the one-shot servo system, it may be mentioned as its merit that unless the in-focus state is obtained, the exposure operation is not effected and therefore photographs which are always in focus can be taken and the first operation of the shutter release button is maintained, whereby the lens can be fixed in the first in-focus position and therefore the focus can be intactly locked and the framing can be easily changed. On the other hand, the demerit of the one-shot servo system is the low traceability of the lens control relative to objects to be photographed which are in vehement motion. That is, once the in-focus state has been obtained, the lens remains stationary unless the first operation of the release button is released and the first operation is again executed. Accordingly, this system is bad in the response of the servo control which responds to the first operation for again obtaining the in-focus state for the movement of the object to be photographed immediately after the in-focus, and the time delay in the meantime causes the shutter chance to be missed.

Also, in the case of the continuous servo system, control of the lens is continued relative to the object to be photographed as long as the first operation of the shutter release button is maintained, and this leads to the merit that photographs which are in focus can be taken at a certain degree of probability and the shutter chance is not missed, but there is the demerit that for an object to be photographed which is in more vehement motion, too much priority is given to the shutter chance and this results in a photograph which is out of focus.

Accordingly, even if a camera is provided with both the one-shot servo system and the continuous servo system and the two systems are made changeable over simply by the photographer's judgement, the demerits of the respective systems will not be eliminated.

SUMMARY OF THE INVENTION

It is the object of the present invention to provide an automatic focus adjustment camera which can always take photographs which are in focus without requiring the change-over of the servo modes by the photographer and does not miss the shutter chance.

The camera of the present invention includes means for driving a photo-taking lens to obtain the in-focus state, operating means operated from an initial state to a first operating state and subsequently to a second operating state, and means for controlling the drive means so as to continuously effect the in-focus driving of the photo-taking lens, for example, for a predetermined time when the operating means is in the initial state.

The control means further drives the photo-taking lens until the in-focus state is obtained when the operating means is operated to the first operating state, and controls the drive means so as to restrain the photo-taking lens at that position when the in-focus state is obtained.

According to such construction of the present invention, for example, when the shutter release button is returned to the initial state after the first operation, the automatic focus adjustment by the so-called continuous servo system is effected so that the focus follows the object field and therefore, the photo-taking lens is always controlled to the in-focus state or a state in which the amount of focus deviation immediately before the in-focus is small.

When the shutter release button is again brought to the first operating state in such continuous servo state, change-over is automatically effected from the continuous servo system to the so-called one-shot servo system and the in-focus state is created in a short time and the first in-focus state is held, and when in this held in-focus state, the shutter release button is operated to the second operating state, the shutter of the camera is released.

DESCRIPTION OF THE PREFERRED EMBODIMENTS

Figure 1:
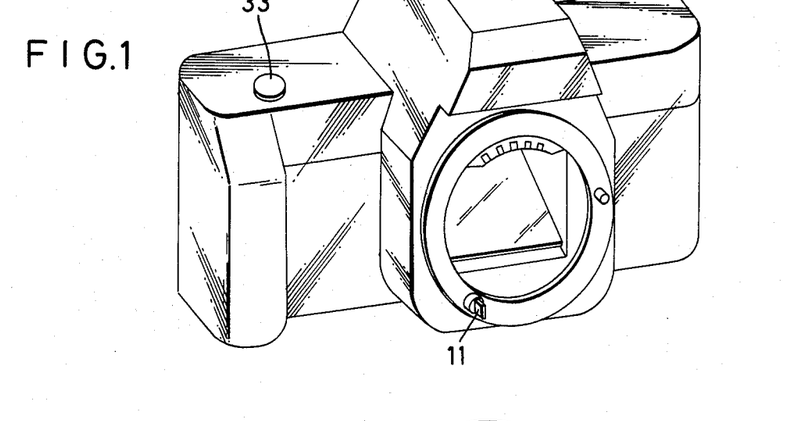
FIG. 1 is a perspective view showing a camera housing in an embodiment of the present invention.

The camera housing 31 of FIG. 1 is provided with a focus detecting device and a drive shaft 11 rotated by a driving device. The photo-taking lens assembly 32 of FIG. 2 has a focusing lens system and a rotary shaft 34 rotated to move the focusing lens system, and the rotary shaft 34 is coupled to the drive shaft 11 when the photo-taking lens assembly is coupled to the camera housing 31 by a conventional method. The focusing lens system is driven by the drive force from the camera housing through the rotary shaft 34, whereby automatic focus adjustment becomes possible. A shutter release button 33 provided on the camera housing operates a release switch as shown in FIG. 3.

Just beneath the shutter release button 33, three electrically conductive contact pieces 35, 36 and 37 are fixed to an insulating member 38. The contact piece 35 is grounded, and the contact pieces 36 and 37 are connected to the input ports of a CPU in a circuit which will be described later. The contact pieces 35 and 36 together form a first operating switch SW1, and the contact pieces 35 and 37 together form a second operating switch SW2.

The contact pieces 35 and 36 themselves are leaf springs, and when in an unoperated state in which the shutter release button 33 is not depressed, the three contact pieces 35, 36 and 37 are separate from one another as shown. When the shutter release button 33 is depressed, the contact piece 35 is depressed at the first stroke and comes into contact with the contact piece 36 and thus, the first operating switch SW1 is closed.

When the shutter release button 33 is further depressed to the second stroke, the contact piece 36 comes into contact with the contact piece 37 while the contact pieces 35 and 36 remain in intimate contact with each other, and thus both the first operating switch SW1 and the second operating switch SW2 are closed.

Figure 4:
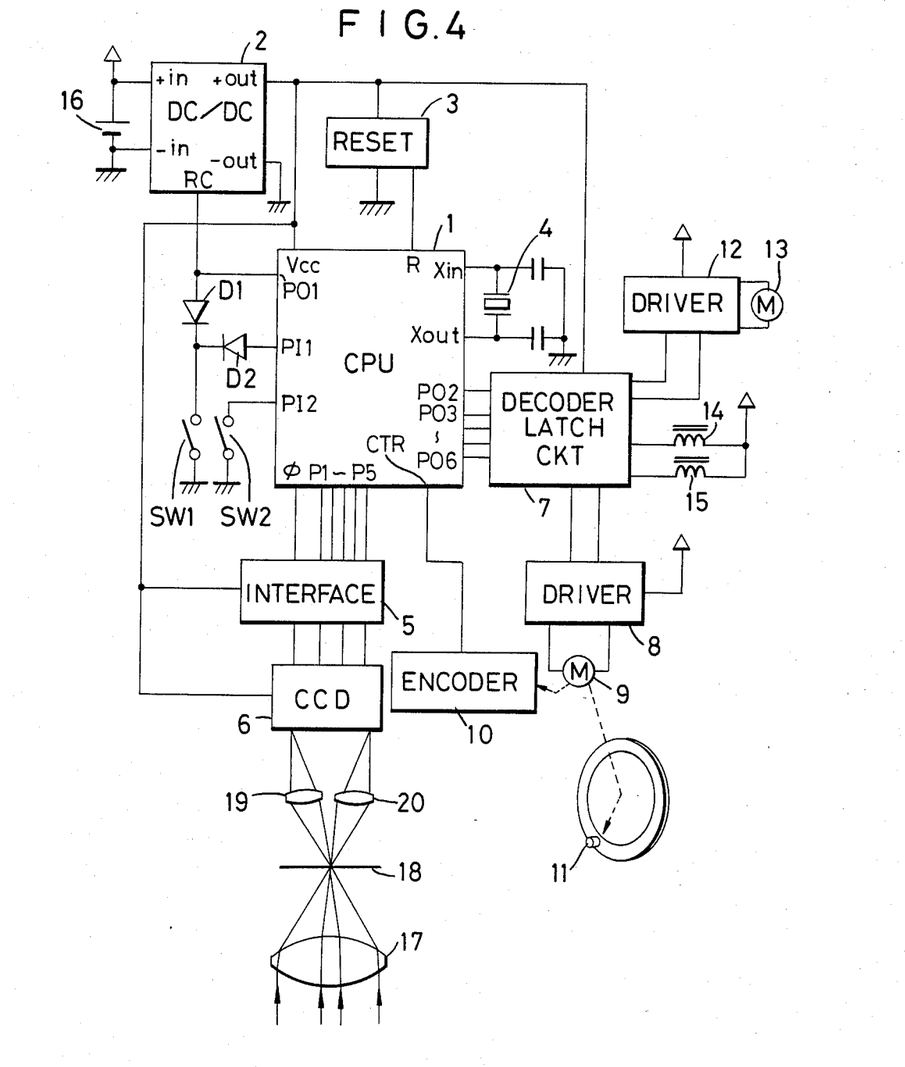
FIG. 4 is a block diagram of a control circuit provided in the camera housing of FIG. 1.

FIG. 4 shows an embodiment of a control circuit for automatic focus adjustment.

A DC/DC converter 2 converts the power source voltage Vb from a battery 16 into a stable power source voltage Vcc (=5V) and supplies it to various circuit portions. The control terminal RC of the DC/DC converter 2 is connected to the first operating switch SW1 through a diode D1, and is further connected to the output port PO1 of the CPU. The switch SW1 is connected between the ground and the cathodes of diodes D1 and D2, and the anode of the diode D2 is connected to the input port PI1 of the CPU.

On the other hand, the second operating switch SW2 is connected between the ground and the input port PI2 of the CPU. The CPU is a microcomputer, and makes a reference clock by an oscillator 4 and an oscillation circuit contained therein, and executes automatic focus control conforming to a control sequence which will become apparent from flow charts described later.

The output of a reset circuit 3 is connected to the reset input terminal R of the CPU, and the reset circuit 3 applies resetting to the CPU when the power source voltage Vcc from the DC/DC converter 2 is below a prescribed voltage, and releases the resetting of the CPU when said power source voltage Vcc exceeds the prescribed voltage.

A light-receiving element 6 for focus detection using a CCD or the like is connected to an interface circuit 5 by a CCD driving clock line and an analog output line, and the interface circuit 5 is connected to the clock output port $\phi$ and the input/output ports P1–P5 of the CPU.

A decoder latch circuit 7 is connected to the output ports PO2-6 of the CPU, and the output stage of the decoder latch circuit 7 has connected thereto a driver 12 for driving a sequence motor 13, a magnet 14 holding the leading blades of a focal plane shutter, a magnet 15 holding the trailing blades of the focal plane shutter, and the driving circuit 8 of a motor 9 for driving the drive shaft 11.

Revolution of the motor 9 is converted into an electrical signal by an encoder 10, the output of which is connected to the counter input terminal CTR of the CPU.

The functions of various circuit portions in FIG. 4 will now be described.

First, the DC/DC converter 2 outputs the prescribed power source voltage Vcc if the control terminal RC is below a predetermined voltage, and this output voltage Vcc is about 5V.

The reset circuit 3 outputs an L-level output to the reset input terminal R of the CPU when the output Vcc of the DC/DC converter 2 is below a predetermined voltage, e.g., 4V, thereby keeping the CPU in its reset state. When the output Vcc of the DC/DC converter 2 exceeds the predetermined voltage, e.g., 4V, the output of the reset circuit 3 assumes an H-level, and the reset state of the CPU is released and the program of the CPU begins to run.

The switch SW1, as shown in FIG. 3, is adapted to be closed at the first stroke of the release button 33, and when the switch SW1 is closed, the control terminal RC of the DC/DC converter 2 is drawn into the L-level through the diode D1 with a result that the output Vcc of the DC/DC converter 2 rises to the prescribed power source voltage. Thus, the resetting of the CPU by the reset circuit 3 is released and the program of the CPU begins to run.

The CPU monitors the input port PI1 to read the ON or OFF state of the switch SW1 through diode D2 during the closing of the main switch caused by the release of the resetting. When the H-level is assumed due to the return of the switch SW1 to its OFF state after the input port PI1 has assumed the L-level upon the closing operation of the switch SW1, the CPU produces an output for keeping the output port PO1 at the L-level for a predetermined time thereafter, with a result that even if the switch SW1 is returned to its OFF state, the control terminal RC of the DC/DC converter 2 is kept at the L-level and a power source supply state is held for a predetermined time.

When the second operating switch SW2 is closed by the operation of the shutter release button 33 to the second stroke, an L-level is applied to the input port PI2 and the CPU drives the shutter to start an exposure operation.

The interface circuit 5 receives a clock from the clock output φ of the CPU and generates a clock for driving the CCD and transmits it to the light-receiving element 6. Also, the interface circuit 5 gives and takes a control signal between it and the input/output port P1 of the CPU and gives and takes data between it and the input/output ports P2-P5 of the CPU, and receives the requirement for a command from the CPU and delivers to the CPU the received light data obtained by the light-receiving element 6. Further, the interface circuit 5 is endowed with the function of successively AD-converting analog voltages output time-serially from the light-receiving element 6.

Of the object light passed through the photo-taking lens 17, the light beams from two different portions (for example, the light beam from the left half and the light beam from the right half) are imaged on a plane 18 equivalent to the film surface. The images on the plane 18 are re-imaged on the light-receiving surface of the CCD by two re-imaging lenses 19 and 20. The two images formed by the re-imaging lenses 19 and 20 are captured as one-dimensional images at different positions on the CCD line sensor. The CCD line sensor which has received this incident optical image performs by the CCD driving clock from the interface circuit 5 the cycle that it effects the storage of charges while receiving the incidence of light, delivers analog signals time-serially from its output terminal to the interface circuit 5 when the CCD line sensor assumes a predetermined output level, and discharges and resets the charges when all the signals have been delivered.

The decoder latch circuit 7 operates drives 8 and 12, magnets 14 and 15 and other unshown loads necessary for photographing by the codes from the output ports P03-6 of the CPU and the latch signal from the output port P02.

The encoder 10 detects the revolution of the motor 9 as by photoelectric means and outputs it as a pulse of a number corresponding to the number of revolutions. The output from this encoder 10 is input to the counter input terminal CTR of the CPU and is used to control the amount of drive of the motor 9.

Figure 2:
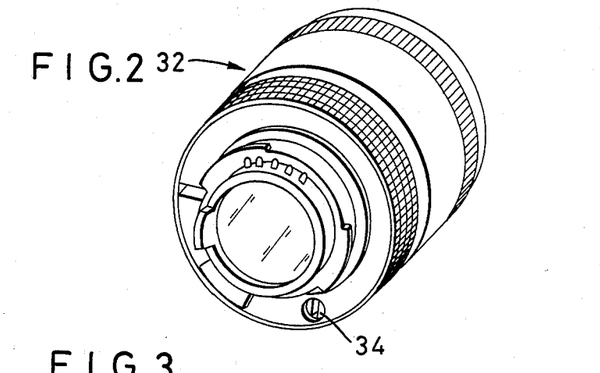
FIG. 2 is a perspective view showing a phototaking lens assembly in an embodiment of the present invention.
Figure 3:
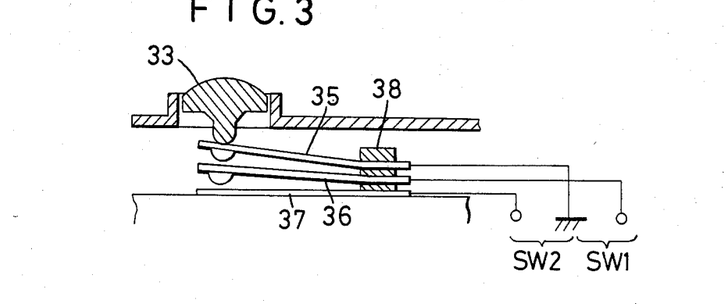
FIG. 3 is a cross-sectional view showing the structure of a shutter release button.

Revolution of the motor 9 is mechanically transmitted to the drive shaft 11, and drives the focusing lens system through the rotary shaft 34 of the photo-taking lens assembly of FIG. 2, thereby accomplishing focusing.

Automatic focus adjustment control will now be described with reference to the flow charts of FIGS. 5A and 5B.

When the first operating switch SW1 is closed by depressing the shutter release button of the camera to the first stroke, the control terminal RC of the DC/DC converter 2 is drawn into the L-level through the diode D1 and the output of the DC/DC converter 2 rises to the prescribed power source voltage Vcc. Upon receipt of this power source voltage Vcc, the L-level output of the reset circuit 3 changes over to the H-level when the power source voltage Vcc exceeds about 4 V, and the resetting of the CPU is released, whereby the program of FIG. 5A is started.

By this start of the program, in a block 100, an L-level output is produced at the output port PO1 to hold the control terminal RC of the DC/DC converter 2 at an L-level, and even if the switch SW1 is opened, the supplied state of the power source voltage Vcc is kept.

Subsequently, the program proceeds to a block 101, in which a predetermined time, e.g., 8 seconds, is set in the timer and the count-down of this timer is started.

Subsequently, the program proceeds to a block 102, in which the light-receiving element 6 is caused to start a charge storing operation, and in a discrimination block 103, termination of the storage is checked up and until the storage is terminated, monitoring of the operating state of the switch SW1 and renewal of the monitoring of the timer are effected in the monitor routine of a block 104.

Figure 6:
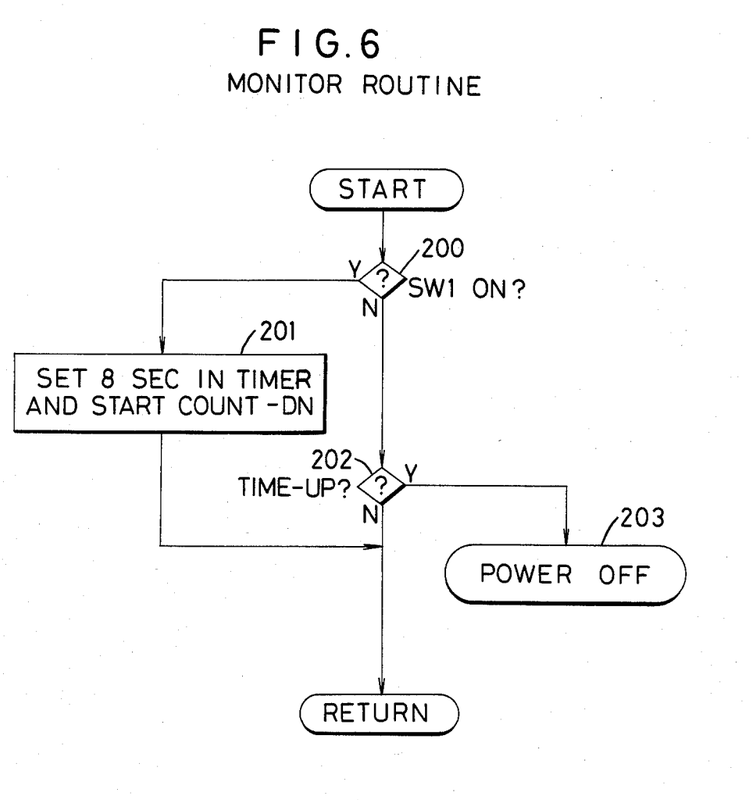
FIG. 6 is a flow chart showing the monitor routines of FIGS. 5A and 5B.

The monitor routine in this block 104 becomes apparent from the flow chart shown as a sub-routine in FIG. 6.

In the monitor routine, whether the switch SW1 is in its ON state is first checked up by the monitoring of the input port PI1 in a discrimination block 200. If the switch SW1 is in its ON state, the program proceeds to a block 201, in which 8 seconds is again set in the timer, whereafter the count-down of the timer is again started. On the other hand, if the switch SW1 is in its OFF state, the program proceeds to a discrimination block 202, in which whether the count content of the timer is zero, that is, whether the time is up, is checked up, and if the time is not up, the program again returns to the main routine of FIG. 5A, and if the time is up, the program proceeds to a block 203, in which the output port PO1 is brought to the H-level and the power source hold is released.

Figure 5A:
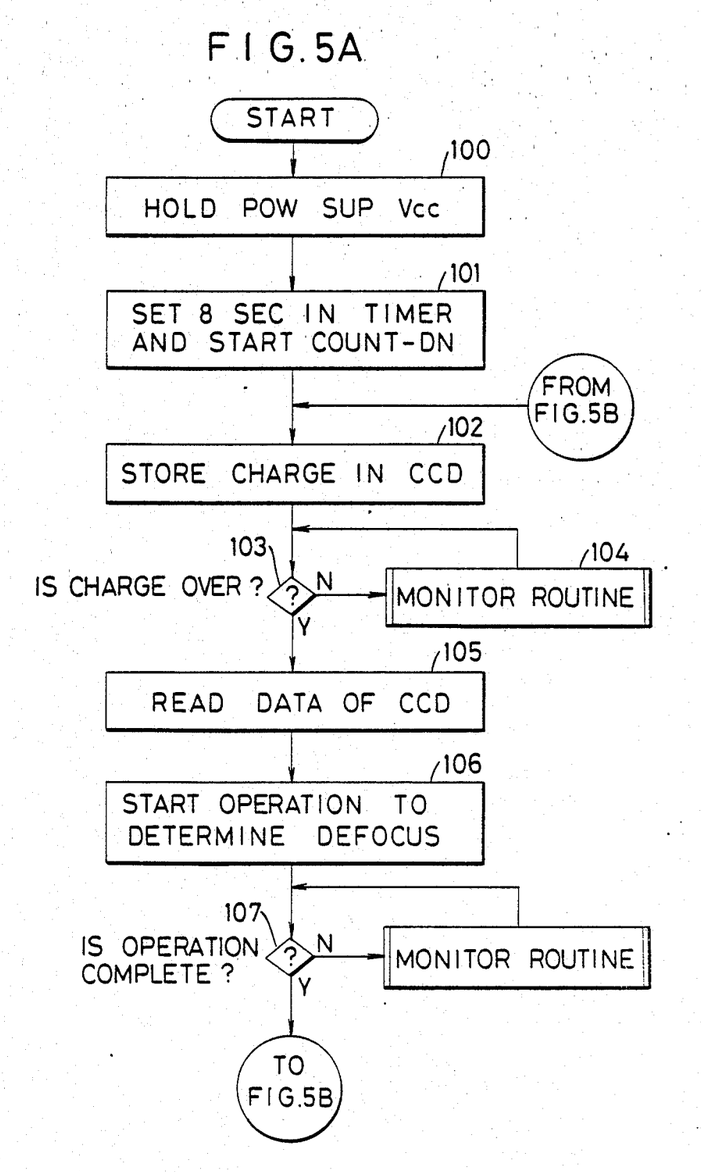
FIGS. 5A and 5B are flow charts showing the control operation for automatic focus adjustment.
Figure 5B:
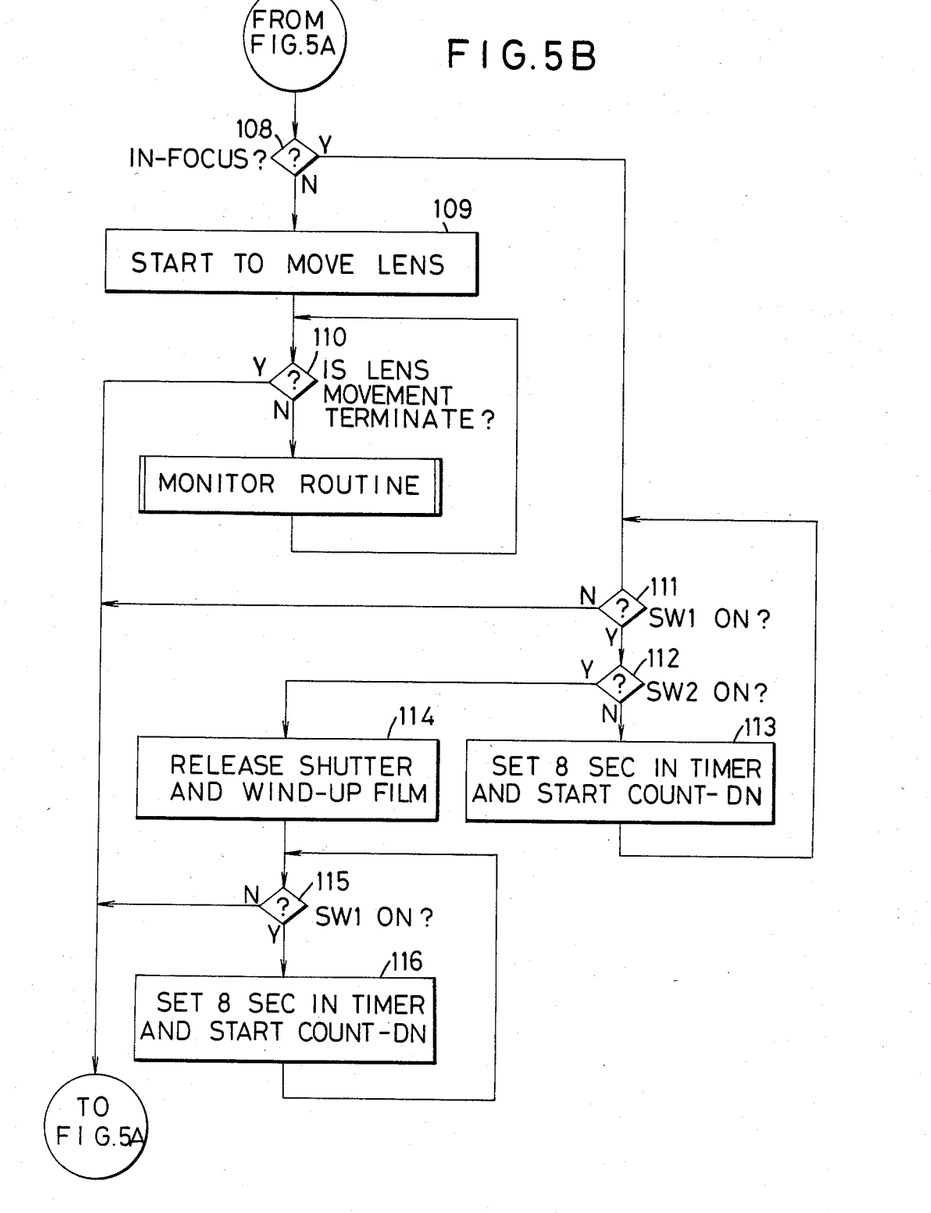

When termination of the charge storage of the CCD is discriminated in the discrimination block 103 of FIG. 5A, the program proceeds to a block 105, in which the charges stored in each element of the CCD are successively transferred and output and are converted into digital data by the interface circuit 5 and the time-serial data of the CCD are read in from the input/output ports P2-P5.

In the next block 106, an operation for calculating the direction and amount of defocus on the basis of the data read in from the CCD is started, and in a discrimination block 107, termination of the operation is monitored and until the operation is terminated, the monitor routine 104 is executed, and the monitoring of the state of the switch SW1 and the renewal of the monitoring of the timer are repeated until the operation is terminated. When the operation of the amount and direction of defocus is terminated in the block 107, whether the calculated amount of defocus is within a predetermined range, that is, whether the calculated amount of defocus is within an amount of defocus which can be regarded as the in-focus, is discriminated in a block 108, and if it is judged as being not in focus, the program proceeds to a block 109, in which the lens driving in the direction of defocus found by the operation is started to drive the automatic focusing lens by the calculated amount of defocus. Termination of this lens driving is monitored in a discrimination block 110, and until the lens driving is terminated, the monitor routine of FIG. 6 is repeated, and when the driving of the lens to the in-focus state is terminated, the program returns to the block 102 of FIG. 5A, in which the storing operation of the CCD for the next detection of the amount of defocus is started.

On the other hand, if in the block 108, the amount of defocus is within a predetermined range and is judged as being in focus, the program proceeds to a discrimination block 111, in which whether the switch SW1 is in its ON state is first checked up, and if the switch SW1 is not in its ON state, the program again returns to the block 102 of FIG. 5A, in which the storing operation of the CCD for the next detection of the amount of defocus is started.

This processing in the block 111 means that as long as the power source is supplied by the timer with the shutter release button being not depressed, that is, with the shutter release button being in its unoperated state, automatic focus control as the continuous servo mode which tries to direct the subsequent focus state to the in-focus is effected even if the in-focus state is obtained.

On the other hand, if the closing operation of the switch SW1 is judged in the block 111, the program proceeds to a discrimination block 112, in which the ON or OFF of the second operating switch SW2 is checked up from the monitor of the input port PI2. If the switch SW2 is in its OFF state, that is, if the depression of the shutter release button stays at the first stroke, the program proceeds to a block 113, in which 8 seconds is set in the timer and countdown of the timer is started, whereafter the program again returns to the discrimination block 111.

This processing of proceeding from the block 112 to the block 113 and returning to the block 111 means that once the in-focus is achieved, the focus lock wherein automatic focus adjustment control is inhibited and the in-focus state is kept as long as the shutter release button is depressed to the first stroke is being applied.

On the other hand, if the ON state of the switch SW2 is discriminated in the block 112, that is, if the depression of the shutter release button has reached the second stroke, the program proceeds to a block 114, in which the shutter release by the mirror-up is effected, and further, after the termination of exposure, automatic wind-up of the film is effected by the driivng of the sequence motor 13.

When the shutter release operation of this block 114 is terminated, the program proceeds to a discrimination block 115, in which the ON or OFF state of the switch SW1 is checked up, and if the switch SW1 is in its ON state, the program proceeds to a block 116, in which 8 seconds is again set in the timer and count-down of the timer is started, and the program again returns to the block 115, in which the processing of checking up the ON or OFF state of the switch SW1 is repeated. When the OFF state of the switch SW1 is checked up in the block 115, the program returns to the block 102 of FIG. 5A, in which the storing operation of the CCD for the next detection of the amount of defocus is started. The switch SW1 check-up routine in this block 115 means that shift is not made to the next new photographing sequence until the photographer releases his finger from the shutter release button after the shutter release.

As is apparent from the above-described flow charts, in the automatic focus adjustment camera shown in the embodiment illustrated above, the power source of the camera is first brought into its ON state by the first operation of the shutter release button, whereby the operation of the automatic focus detecting device is started. Even if the shutter release button is released thereafter, the ON state of the power source is kept by the function of the timer for 8 seconds from after the first operation is released last, and for the time of 8 seconds during which this timer operates, automatic focus adjustment takes place in the continuous servo system and thus, the camera continues to pursue the in-focus to the object to be photographed. If during the automatic focus adjustment by the 8-second continuous servo system using the timer, the first operation of the shutter release button is again performed, the one-shot servo type automatic focus adjustment is started from this moment and, when the in-focus state is obtained, the lens driving is stopped to thereby maintain that in-focus state. When the shutter release button is further depressed thereafter, the shutter is released once and windup of the film is effected.

If the shutter release button is depressed to the second stroke beyond the first stroke before the in-focus state is obtained by the automatic focus adjustment usingthe one-shot servo system by half-depression, the shutter is not released until the in-focus state is obtained, and the shutter release is effected immediately after the in-focus.

After the shutter release, the control operation of the automatic focus adjustment is not effected but the lens remains stopped unless the finger is released from the shutter release button, and when the finger is released from the shutter release button, the automatic focus adjustment by the continuous servo system is resumed with the 8-second power source ON state being again held by the timer.

In the above-described embodiment, the state in which the finger has been released from the shutter release button after the first operation of the shutter release button is detected as the unoperated state and the automatic focus adjustment by the continuous servo system is effected with the power source being kept in its ON state for the predetermined time determined by the timer, but as another embodiment, in a camera wherein a main switch is discretely provided in addition to the shutter release button, the timer may be started by the closing operation of the main switch to keep the ON state of the power source for a predetermined time, during which the automatic focus adjustment by the continuous servo system may be effected.

I claim:

1. An automatic focus detection camera comprising:
   a photo-taking lens;
   detecting means for detecting the deviation of the image of an object to be photographed formed by said photo-taking lens from the in-focus state and outputting an in-focus signal when said deviation is substantially null;
   drive means for moving said photo-taking lens for the in-focus in accordance with said deviation detected by said detecting means;
   operating means operated for starting the photographing from an initial state to a first operating state and subsequently to a second operating state to start photographing;
   first control means for repetitively controlling said drive means when said operating means is in said initial state so that each time said in-focus state is lost, said photo-taking lens is moved until said in-focus signal is output, and controlling said drive means when said operating means is operated to said first operating state so that said photo-taking lens is moved until said in-focus signal is output and that the movement of said photo-taking lens is inhibited in response to said in-focus signal; and
   second control means for starting exposure when the movement of said photo-taking lens is inhibited by said first control means and said operating means is operated to said second operating state.

2. An automatic focus detection camera according to claim 1, further comprising means for supplying an electric power and wherein said first control means repetitively controls said drive means in response to said electric power being supplied in said initial state of said operating means.

3. An automatic focus detection camera according to claim 1, wherein said operating means includes timing means adapted to operate by said operating means being returned from said first operating state to said initial state, and said first control means repetitively controls said drive means in response to said timing means.

4. An automatic focus detection camera according to claim 3, wherein said timing means includes a timer for counting a predetermined time, and said first control means repetitively controls said drive means until said predetermined time elapses.

5. An automatic focus detection camera comprising:
a photo-taking lens;
detecting means for detecting the deviation of the image of an object to be photographed formed by said photo-taking lens from the in-focus state and outputting an in-focus signal when said deviation is substantially null;
drive means for moving said photo-taking lens for the in-focus in accordance with said deviation detected by said detecting means;
operating means operated from an initial state to an operating state; and
control means for controlling said drive means to move said photo-taking lens for the in-focus when said operating means is operated to said operating state and inhibiting the movement of said phototaking lens in response to said in-focus signal, and repetitively controlling said drive means for a predetermined time to move said photo-taking lens for the in-focus when said operating means is returned from said operating state to said initial state.

6. An automatic focus detection camera comprising:
a photo-taking lens;
detecting means for detecting the deviation of the image of an object to be photographed formed by said photo-taking lens from the in-focus state and outputting an in-focus signal when said deviation is substantially null;
drive means for moving said photo-taking lens for the in-focus in accordance with said deviation detected by said detecting means;
operating means operated from an initial state to a first operating state and subsequently to a second operating state;
means for supplying an electric power to said camera in response to the operation of said operating means to said first operating state;
exposure control means for starting exposure in response to the operation of said operating means to said second operating state;
timer means adapted to start to count a predetermined time when said operating means is returned to said initial state; and
means for repetitively controlling said drive means while said timer means is counting so that each time said in-focus state is lost, said photo-taking lens is moved until said in-focus signal is output.

* * * * *